Feb. 10, 1959  E. KOLISCH  2,872,807
EQUIPMENT FOR DETERMINING THE CENTER OF GRAVITY OF AN AIRCRAFT
Filed July 13, 1954  2 Sheets-Sheet 1

INVENTOR
Emil Kolisch
BY
Dean Fairbank + Hirsch
ATTORNEYS

Feb. 10, 1959 E. KOLISCH 2,872,807
EQUIPMENT FOR DETERMINING THE CENTER OF GRAVITY OF AN AIRCRAFT
Filed July 13, 1954 2 Sheets-Sheet 2

INVENTOR
*Emil Kolisch*
BY
*Dean Fairbank & Hirsch*
ATTORNEYS

United States Patent Office 2,872,807
Patented Feb. 10, 1959

2,872,807

EQUIPMENT FOR DETERMINING THE CENTER OF GRAVITY OF AN AIRCRAFT

Emil Kolisch, New York, N. Y., assignor to Continental Electrolog Corp., a corporation of New York Application July 13, 1954, Serial No. 442,982

19 Claims. (Cl. 73—65)

As conducive to an understanding of the invention, it is noted that in order for an aircraft to take-off, fly and land safely, its center of gravity along the length of the plane must be at some predetermined location which may vary between certain definite fixed limits.

Where automatic equipment such as of the type shown in co-pending application Serial No. 362,629, filed June 18, 1953, now Patent No. 2,686,426, dated August 17, 1954, is used to determine the distance from a given reference datum of the center of gravity of an aircraft, based upon the distribution of weight of the aircraft on its supporting gear and the arm of such weight such as, for example, the distance between the main wheels and the extra wheel, such as the nose wheel, or the wheel base of the aircraft, inasmuch as the actual wheel base of the aircraft may differ from the wheel base specified in the technical manual for the aircraft, due to strain on the wheel struts during landings, which may cause elongation or contraction of the wheelbase, and due to the weight of the loaded aircraft at the time the center of gravity is determined, which also may cause elongation or contraction of the wheelbase, the computed center of gravity may differ from the actual center of gravity.

The center of gravity as determined with the aircraft grounded and thus inclined from level flight attitude will differ from the center of gravity in actual flight.

Where to compensate for such deviation from level flight attitude, the aircraft is physically leveled by means of jacks, for example, the operation is difficult and time-consuming and requires the services of many personnel at great cost and with possible damage to the aircraft as a result of slippage of such jacks.

The action of the wind, will also cause deviation between the center of gravity as determined and the true center of gravity.

Unless the factors above described are taken into consideration in operation, the center of gravity as determined by the equipment may differ from the true center of gravity of the aircraft to such extent as to entail harmful consequences in those cases in which the difference is sufficient to exceed the safe limits prescribed for take-off, flying and landing.

In order that the determination of the center of gravity of the aircraft at time of take-off be accurate, the weight of the crew and passengers and their position in the aircraft must be a factor in the determination of center of gravity by the equipment.

If, when the center of gravity of the aircraft is determined, it is necessary for the crew and passengers or a like number of personnel to be at their assigned stations in the aircraft and the aircraft is not to take off immediately after such determination, the need for such personnel to be available and to go on board the aircraft is time-consuming and interferes with the performance of the normal duties of such personnel.

It is accordingly among the objects of the invention to provide an equipment which is simple, compact, light in weight and readily portable and which has a minimum of moving parts and thus is not likely to become deranged by even an unskilled person and will automatically take into account the actual weight of the loaded aircraft and the actual position of its contents, and which may readily be set to take into account the angle of inclination of the aircraft, and its actual wheelbase, without need for time-consuming calculations, and also to take into account the weight and location of crew and personnel without need for the presence of such personnel and which will thereupon, without need for time-consuming calculations or manipulations of any sort, and without the need for consulting tables or any other operation subject to human error, quickly and accurately indicate the true final center of gravity of the aircraft, in order to facilitate checking that it is within the permissible limits for safe take-off, flyng and landing.

Another object of the invention is to provide an equipment of the above type which determines the distance of the center of gravity of the aircraft from a given reference datum based upon the distribution of the actual weight of the aircraft on each set of supporting gear and the actual distance of each set of supporting gear from the reference datum and which also may readily be set to take into account the angle of inclination of the aircraft and the weight and location of crew and personnel also without need for the presence of such personnel.

Another object is to provide an equipment of the above type which may readily be set to take into account the direction and velocity of the wind with respect to its effect on the center of gravity of the aircraft.

Another object is to provide an equipment by which the true position of center of gravity may be observed at all times as the loading proceeds, so as to dispense with the need for extensive shifting of the cargo in a fully loaded aircraft which may become necessary to assure safety when such guidance is not afforded.

Another object is to provide an equipment of the above character which is universally applicable, by resort to a simple manipulation, to be set to effect any and all the compensations noted in determining center of gravity for any of various models, sizes and specifications of aircraft within the range of the equipment.

According to the invention, center of gravity of an aircraft is determined by use of basic equipment which may be similar to that of the co-pending application above-identified, with simple auxiliary impedances associated with one or more arms of the bridges of such equipment and adjustable at will to introduce one or more or all of the various compensating factors above referred to in the automatic determination of the center of gravity.

In the accompanying drawings in which are shown one or more of various possible embodiments of the several features of the invention.

Figures 1, 2:
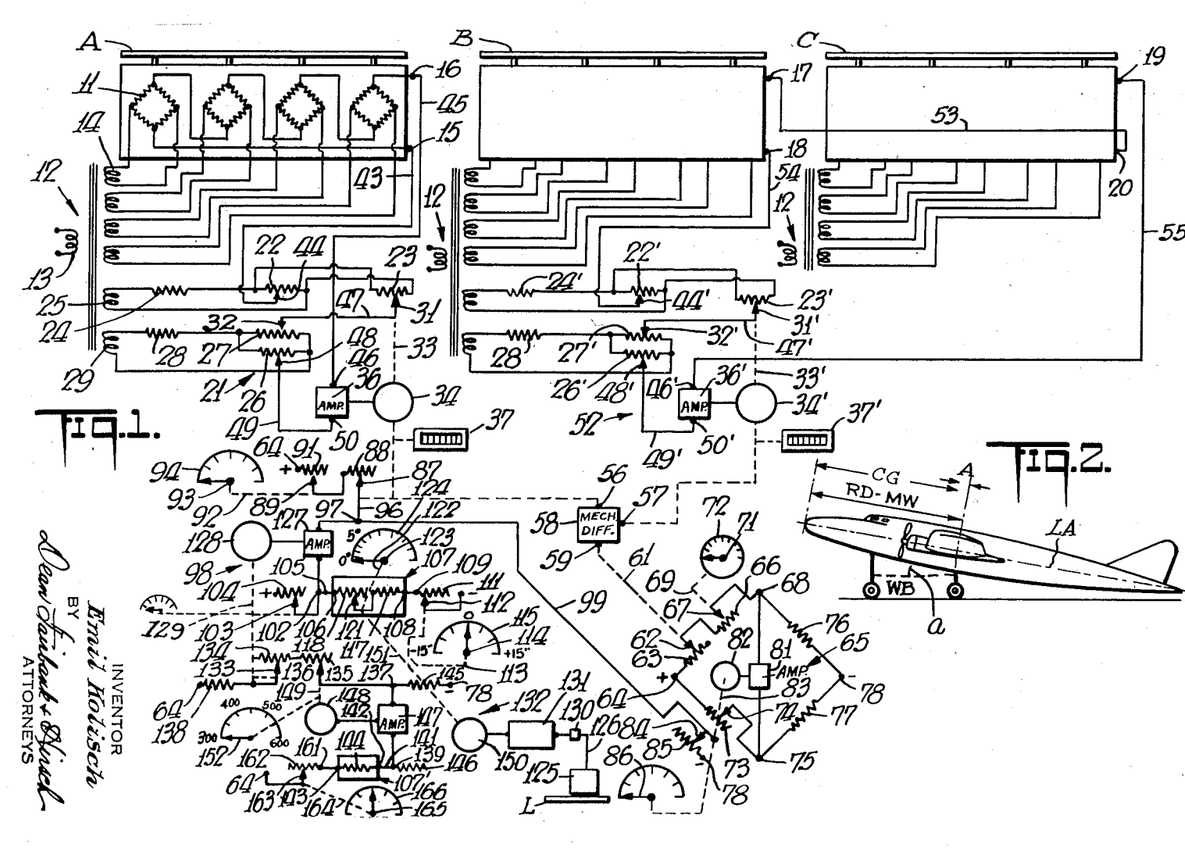
Fig. 1 is a diagrammatic view of one embodiment of the invention.
Fig. 2 is a diagrammatic view of a grounded aircraft, illustrating the use of the equipment when the moments are determined about the main wheels.

In the illustrative embodiment of Fig. 1 of the drawings, platforms diagrammatically shown at A, B and C are provided to carry the additional gear, usually the nose wheel of the aircraft and the main gear usually the two main wheels, respectively.

Associated with each of the platforms are weight responsive devices which may be suitable impedance units such as networks of strain gauges 11 of familiar type commonly known as "load cells," usually four in number to support the respective corners of the ordinarily rectangular platform. As diagrammatically shown, with respect to platform A, a transformer 12, the primary winding 13 of which is connected to a source of alternating current, has secondary windings 14 connected respectively to the inputs of the several strain gauges 11. Like transformers 13 are similarly related to the strain gauges on platforms B and C. The outputs of all of the strain gauges of each platform are connected in series, as shown, and when subjected to the weight borne on the platform, the voltage evolved by the strain gauges under the applied potential will be applied respectively across terminals 15, 16 of platform A; terminals 17, 18 of platform B and terminals 19, 20 of platform C.

According to the illustrative embodiment herein shown, in order correctly and automatically to determine the weight on platform A and platforms B and C, the voltage output of the associated strain gauges due to the weight of the unloaded platform A and platforms B and C is first balanced out as by a countervailing voltage, and then the output voltage of the strain gauges, due to the load on platform A and platforms B and C is balanced out also by a countervailing voltage, the same means which regulates such latter countervailing voltage controlling an indicator calibrated in increments of weight.

Although any suitable balancing circuit may be used, in the illustrative embodiment herein shown with respect to platform A, such balancing circuit 21 desirably includes a pair of parallel connected resistors 22 and 23, which are connected in series with a resistor 24 to a secondary winding 25 of the transformer 13, and a second pair of parallel connected resistors 26 and 27 connected in series with a resistor 28 to another secondary winding 29 of the transformer 13. The two resistors 23 and 27 serve as voltage dividers, as hereinafter set forth.

Although the resistors 23 and 27 may be of any suitable type, they each desirably form part of a separate potentiometer having an associated movable contact arm 31, 32, respectively. The contact arm 32 is manually adjustable to any desired setting in order to balance out the weight of the unloaded platform. The contact arm 31 is controlled by the shaft 33 for automatic setting to balance out the load on the platform, by means of a servo-motor 34 which is connected to a servo-amplifier 36. The servo-motor and servo-amplifier may be of the type sold by Brown Instrument Company. The shaft 33 desirably controls a suitable indicator, illustratively a counter 37, such as that put out by Veeder Root Company, which is calibrated in increments of pounds to indicate when the weight borne by the unloaded platform A is balanced out by the adjustment of arm 32.

The output terminals 15, 16 of platform A are desirably connected respectively by lead 43 to an adjustable tap 44 engaging the resistor 22, and by lead 45 to terminal 46 of servo-amplifier 36. The contact arm 31 engaging the resistor 23, is connected by lead 47 to contact arm 32 of resistor 27. The resistor 26 is desirably center tapped as at 48 and such center tap is connected by lead 49 to terminal 50 of servo-amplifier 36.

The strain gauges of platforms B and C are connected in series and the combined output of said platforms are fed to a balancing circuit 52 identical to balancing circuit 21 and having the same reference numerals primed. To this end, the terminal 17 of platform B is connected by lead 53 to terminal 20 of platform C and the terminals 18 and 19 of platforms B and C are connected respectively by leads 54 and 55 to contact arm 44' of resistor 22' of balancing circuit 52, and to terminal 46' of servo-amplifier 36' of said balancing circuit.

The shaft 33 and 33' of servo-motors 34 and 34' of balancing circuits 21 and 52 are connected respectively to the inputs 56 and 57 of a mechanical differential unit 58. The output 59 of said differential, which will be set to a value proportional to the sum of the weights on the three platforms A, B and C, is connected by shaft 61 to contact arm 62 of variable resistor 63, one end of which is connected to positive terminal 64 of a bridge 65. The contact arm 62 is connected to one end of a gross weight crew and passenger compensation variable resistor 66, which has its contact arm 67 connected to junction 68 of bridge 65. Thus, resistors 63 and 66 are connected in series and form one arm of said bridge. The position of contact arm 67 is set by means of a shaft 69, controlled by knob 71 of dial 72.

Positive terminal 64 of bridge 65 is also connected to one end of a variable balancing resistor 73, the movable arm 74 of which is connected to junction 75 of bridge 65 to form a second arm of said bridge. A pair of resistors 76 and 77 are connected at one end respectively to junctions 68 and 75 and at their other ends to negative terminal 78 to complete the bridge circuit.

Connected across junctions 68 and 75 of bridge 65 is a servo-amplifier 81, the output of which controls a servo-motor 82 which has a shaft 83 that drives contact arm 74 of resistor 73, as well as the contact arm 84 of a variable resistor 85 which will be set to a value proportional to the value of resistor 73. In addition, shaft 83 also drives an indicator 86 which will be set to the gross weight of the aircraft in the manner hereinafter described.

Shaft 33 of servo-motor 34 is also connected to the contact arm 87 of a variable resistor 88, one end of which is connected to the contact arm 89 of a nose weight crew and passenger compensation resistor 91, one end of which is connected to positive terminal 64. The position of contact arm 89 is set by means of a shaft 92 controlled by knob 93 of dial 94.

The contact arm 87 is connected by lead 96 to junction 97 of a center of gravity bridge 98. Also connected to junction 97 by lead 99, is contact arm 84 of variable resistor 85, one end of which is connected to negative terminal 78. The junction 102 of bridge 98 is connected to the contact arm 103 of a balancing resistor 104, one end of which is connected to positive terminal 64. The junction 102 is also connected to a terminal 105 to which the terminal 106 of an adaptor unit 107 is connected, the other terminal 108 of the adaptor being connected to a terminal 109 to which one end of a wheelbase compensating variable resistor 111 is connected. The contact arm 112 of resistor 111 is connected to negative terminal 78 and is set to desired position by means of a shaft 113 controlled by knob 114 of dial 115.

The adaptor 107 which may be of the plug-in type, one for each type of aircraft, illustratively contains two resistors, a fixed wheelbase resistor 117 and a variable off level compensating resistor 118.

As in practice, the actual wheelbase of the aircraft (distance from nose wheel to main wheels) may deviate from the wheelbase specified in the technical manual for the aircraft type, by having the resistor 117 of value proportional to such specified wheelbase, less, say, fifteen inches, and the resistor 111 in series therewith of value equal to thirty inches, if the contact arm 112 of resistor 111 is set to midpoint, then a value of the wheelbase equal to the specified wheelbase will be set into circuit. If desired, by shifting the contact arm 112, a wheelbase value of more or less than the specified value of the wheelbase can be placed into circuit as required.

One end of resistor 117 is connected to terminal 108 of the adaptor and the other end of resistor 117 is connected to contact arm 121 of resistor 118, one end of which is connected to terminal 106 of the adaptor.

The contact arm 121 of resistor 118 is connected by shaft 122 to the knob 123 of a dial 124 of the adaptor, the function of which is to correct for the off level attitude of the aircraft at the time its center of gravity is being determined.

Thus, as shown in Fig. 2, the aircraft when loaded, may have its longitudinal axis LA displaced from the horizontal by an amount equal to angle "$a$" and the aircraft is generally provided with a level plate L (Fig. 1) which may be used in determining the extent of such displacement. In the illustrative embodiment, the correction for level flight attitude of the aircraft is equal to the normal wheelbase WB divided by the cosine of angle "$a$" less such normal wheelbase, and the resistor 118 is so calibrated that additional resistance will be placed into circuit of value proportional to:

$$\frac{WB}{\text{cosine } a} - WB$$

For an aircraft type X having a wheelbase of 330 inches, this calibration is based on the following table:

| Angle $a$, degrees | cosine Angle $a$ | $\frac{330}{\text{cosine angle } a}-330$ in ohms |
|---|---|---|
| 1 | .9998 | 0.07 |
| 2 | .9994 | 0.20 |
| 3 | .9986 | 0.46 |
| 4 | .9976 | 0.80 |
| 5 | .9962 | 1.26 |
| 6 | .9945 | 1.83 |
| 7 | .9925 | 2.49 |
| 8 | .9903 | 3.23 |
| 9 | .9877 | 4.11 |
| 10 | .9848 | 5.09 |

The resistor 118 may be set manually by knob 123 to the degree of inclination indicated on dial 124, as determined by a suitable device such as a spirit level positioned on level plate L or it may be automatically set by means of a servo-gyro 125 of conventional type mounted on the level plate L of the aircraft and which is designed to provide an output of value proportional to the angle of inclination of the aircraft.

If the aircraft is equipped with a servo-gyro 125, its output is connected by lead 126 through connector 130 to the input of a servo-amplifier 131 in the equipment and this servo-amplifier 131 controls a servo-motor 150, which, through shaft 151 drives control arm 121 of resistor 118 to set the latter.

Connected across terminals 97 and 102 of the center of gravity bridge 98 is a servo-amplifier 127 which controls a servo-motor 128. The servo-motor 128 through shaft 129 drives contact arm 103 of balancing resistor 104 to a setting to balance the bridge 98.

The balanced position of variable resistor 104 is related to the distance of the center of gravity from the main wheels according to the formula:

$$\frac{A}{WB}=\frac{NW}{TW}$$

where, as shown in Fig. 2, A is the distance of the center of gravity from the main wheels, WB is the distance between the nose wheel and the main wheels (determined by the wheelbase resistor 117 as corrected by the settings of series connected off level correction resistor 118 and wheelbase correction resistor 111), NW is the nose wheel weight (determined by series connected nose weight resistor 88 and nose weight crew and passenger compensation resistor 91) and TW is the total weight of the aircraft (determined by resistor 85 which corresponds to the settings of series connected gross weight resistor 63 and gross weight crew and passenger compensation resistor 66).

The four impedances or resistors in the respective arms TW, NW, WB and A of bridge 98 may be arranged in any manner desired, provided only that arms TW and A are opposed.

Where the center of gravity indication is to be in terms of distance from the main wheels, the shaft 129 of servo-motor 128 of bridge 98 may also drive a suitable indicator. Where the center of gravity indication is to be in terms of distance from a given reference datum other than the main wheels, additional circuit components are provided for universal application of the equipment for all types of aircraft within the range of the equipment.

Thus, assuming that the reference datum is the nose of the aircraft as shown in Fig. 2, an additional balancing circuit 132 is provided, also preferably a bridge.

The shaft 129 of servo-motor 128 of bridge 98 also drives the contact arm 133 of variable resistor 134, one end of which is connected to one end of a balancing resistor 135, the contact arm 136 of which is connected to junction 137 of bridge 132. The contact arm 133 is connected to one end of a fixed resistor 138 connected at its other end to positive terminal 64.

The junction 139 of bridge 132 is connected to terminal 141 to which terminal 142 of said adaptor 107' is connected, said adaptor also having a terminal 143 connected to terminal 161 to which one end of a compensating variable resistor 162 is connected. The contact arm 163 of resistor 162 is connected to positive terminal 64 and is set to desired position by means of a shaft 164 controlled by knob 165 of dial 166.

In practice, the position of the main wheels may shift so that the distance between the reference datum and the main wheels may deviate from the distance specified in the technical manual for the aircraft type. A resistor 144 is provided in the adaptor, connected to terminals 142 and 143 respectively, and of value proportional to the distance of the reference datum from the main wheels less, say, fifteen inches (illustratively 415 inches). If the contact arm 163 of resistor 162 in series therewith is set to mid-point, then a value of the distance between the reference datum and the main wheels equal to the specified distance will be set into circuit. If required, by shifting the contact arm 163, a value more or less than the specified value can be placed into circuit. A pair of resistors 145 and 146 are connected at one end respectively to junctions 137 and 139 and at their other ends to negative terminals 78.

Connected across junctions 137 and 139 is a servo-amplifier 147 which controls a servo-motor 148 and servo-motor 148 through shaft 149 determines the setting of contact arm 136 and center of gravity indicator 152.

To use the equipment shown in Fig. 1 for checking an aircraft model X, for example, the adaptor for that particular type of aircraft is put into circuit. Assuming that the aircraft has a wheelbase of 330 inches and one ohm equals one inch, the resistor 117 will have a value of 315 inches (wheelbase less 15 inches as previously described) and the resistor 144 a value of 415 inches (distance between reference datum and main wheels less fifteen inches).

Depending upon the angle of inclination of the aircraft, which, for purposes of illustration is four degrees, the contact arm 121 of resistor 118 is set to a position related to four degrees either manually by knob 123 or automatically by the action of the servo-gyro 125 above described and as can be seen from the table hereinabove set forth, a resistance of .8 ohm will be placed into circuit.

The resistors 117 (315 ohms) and 118 (.8 ohm) will be connected in series with wheelbase correction resistor 111 and assuming that the actual wheelbase of the aircraft as measured, is 335 inches, requiring an addition of five inches to the specified wheelbase of 330 inches, the knob 114 is turned to plus five inches to set the control arm 112 of resistor 111 to twenty ohms.

As a result of the settings above described, the sum of the series connected resistances 117, 118 and 111 will be 335.8 ohms, which is the wheelbase of the aircraft corrected for off level attitude and deviation in the actual length of the wheelbase from the specified length.

In addition, assuming that the actual distance between the reference datum and the main wheels is 430 inches, the contact arm 163 of resistor 162 is set to mid-point.

As the outputs from platforms B and C are connected in series, the voltage from platform A and the combined voltages from platforms B and C will be applied in series with voltages opposite in polarity, from the series connected voltage dividers 23, 27 and 23', 27', across the respective terminals 46, 50 and 46', 50' of servo-amplifiers 36, 36' and if each pair of such opposed voltages are unequal, the associated motor 34, 34' will be energized to turn shafts 33, 33' and move contact arms 31, 31'.

When each contact arm 31, 31' has reached that portion of the corresponding resistance 23, 23' which provides a voltage equal to that supplied from the output terminals of the associated platforms A, B and C, balance will be achieved, so that the motors 34, 34' will stop rotating and the counters 37, 37' driven by shafts 33 and 33' will indicate the weight of the unloaded platforms A and B plus C respectively.

The contact arms 32 and 32' are then manually adjusted to balance out the weight of the unloaded platform which will be achieved when the counters 37, 37' indicate zero.

As the crew and the passengers may not be in the aircraft at the time its center of gravity is determined, the effect that the weight of the crew and passengers will have on the calculations is set into the circuit. Thus, assuming that the aircraft is to carry a crew of four and two passengers, by consulting a chart previously prepared by the aircraft manufacturer, the effect that such personnel will have on the gross weight of the aircraft and on the nose wheel weight (which is dependent upon the position of such personnel) can be determined and the knobs 71 and 93 are turned to set the contact arms 67 and 89 of resistors 66 and 91 to the desired amount. Based upon weights of 180 pounds per person, a personnel load of 6 will add 1,080 to the gross weight and based on the chart we will assume that it will add 200 pounds to the nose wheel weight. Thus, assuming that one ohm equals one pound, 200 ohms of resistor 91 will be placed in series with resistor 88 and 1,080 ohms will be placed in series with resistor 63.

When the nose wheel of the loaded aircraft is placed on platform A and the main wheels on platforms B and B respectively, as previously described, due to the weight of the aircraft on the platforms A, B and C, the output of platform A and the combined output of platforms B and C will be applied across the terminals 46, 50 of servo-amplifier 36 of balancing circuit 21, and across the terminals 46', 50' of servo-amplifier 36' of balancing circuit 52.

As previously described, the associated servo-motors 34 and 34' will set contact arms 31 and 31' until that portion of the associated resistor 23, 23' is in circuit which provides a voltage equal to that supplied from platform A and platforms B, C. At this time the circuits 21, 52 will be balanced and the motors 34, 34' will stop rotating.

For a model X aircraft, assuming the weight on the nose wheel is 6,000 pounds, the shaft 33 of motor 34 will set contact arm 87 to tap off 6,000 ohms of resistor 88 and as this resistor is in series with resistor 91 set to 200 ohms, 6,200 ohms will be placed into circuit to form one arm of center of gravity bridge 98.

The shaft 33 will also turn the input 56 of differential 58 to a position related to a value of 6,000 ohms, and assuming that the weight on the two main wheels is 44,000 pounds, the shaft 33' of motor 34' will turn the input 57 of differential 58 to a position related to a value of 44,000 pounds. Hence, the output 59 of differential 58 will set the resistor 63 of bridge 65 to a value related to 50,000 pounds or 50,000 ohms (the sum of the weight on platforms A and B plus C). As the resistor 66 of bridge 65 has been set to a value of 1,080 pounds or 1,080 ohms, 51,080 ohms will be set into one arm of bridge 65.

If the bridge 65 is not in balance, current will flow through servo-amplifier 81 to energize servo-motor 82 and such motor will turn shaft 83 to set the control arm 74 to tap off 51,080 ohms of resistor 73 at which time bridge 65 will be in balance. Shaft 83 will also set resistor 85 to a value of 51,080 ohms, and such resistance value which represents the compensated gross weight of the aircraft will be connected in a second arm of the center of gravity bridge 98.

If the center of gravity bridge 98 is unbalanced, current will flow through its servo-amplifier 127 to energize servo-motor 128. As the third arm of bridge 98 has been set to 335.8 ohms as previously described, by the formula:

$$\frac{A}{WB} = \frac{NW}{TW}$$

the equation $$\frac{\text{Resistor } 104}{335.8} = \frac{6,200}{51,080}$$

is solved for the resistor 104, which is 40.76 ohms.

Hence, motor 128 will rotate until resistor 104 is set to 40.76 ohms at which time bridge 98 will be in balance.

This value of 40.76 ohms is equal to 40.76 inches, the distance of the center of gravity of the aircraft from the main wheels.

The equipment is designed to indicate the distance of the center of gravity from a given reference datum which is illustratively 430 inches forward of the main wheels. To this end, the shaft 129 of motor 128 will set contact arm 133 to tap off 40.76 ohms of resistor 134. For ease in calibration of the center of gravity dial, as the center of gravity is generally more than 300 inches from the reference datum, the resistor 138 has a value of 300 ohms and this is in series with resistor 134 set to 40.76 ohms. As resistor 144 of bridge 132 is equal to 430 ohms, if the bridge is unbalanced, current will flow through servo-amplifier 147 and motor 148 will rotate and through shaft 149 set contact arm 136 so that the value of resistor 135 in circuit is equal to resistor 144—(resistor 134 + resistor 138)

or 430—(40.76+300)=89.24 ohms and the indicator 152 will become set to 389.24 inches, the distance of the center of gravity from the reference datum.

The embodiment of the equipment shown in Fig. 1 computes the center of gravity of the aircraft based upon the moments about the main wheels. The center of gravity can as readily be computed by utilizing the moments about the nose wheel by the circuit shown in Fig. 3 which is identical in many respects to that shown in Fig. 1 and in which corresponding parts have the same reference numerals primed.

Figure 3:
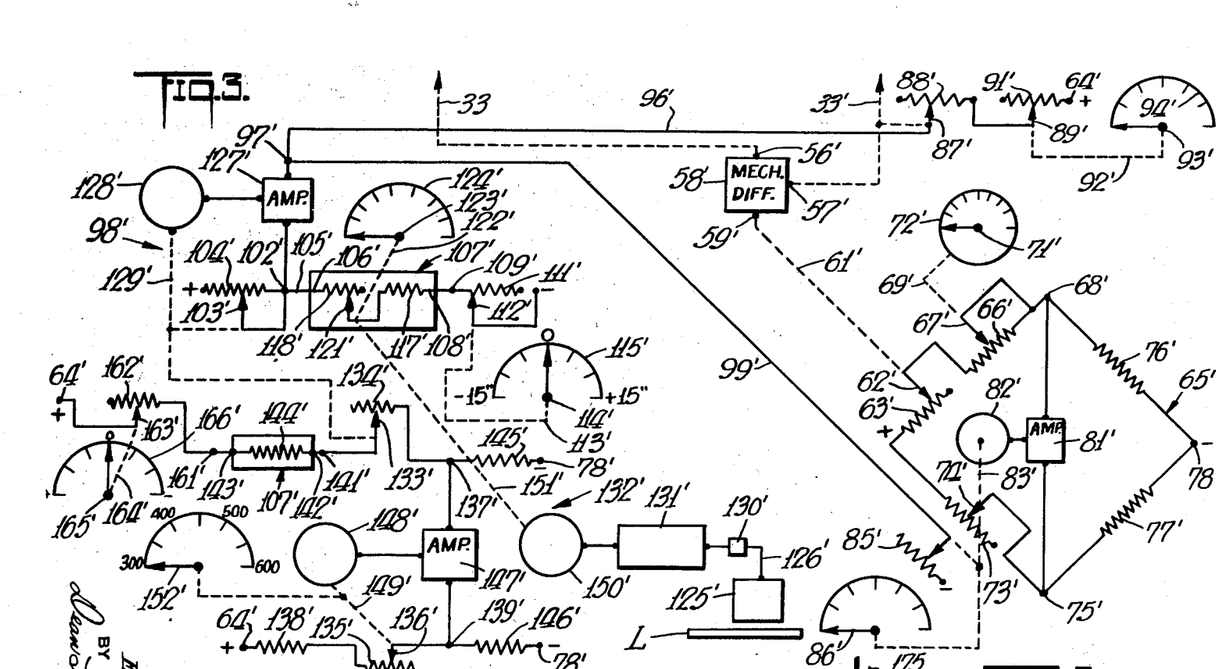
Fig. 3 is a view similar to Fig. 1 of another embodiment of the invention.

Referring to Fig. 3, the shafts 33 and 33' as previously described, are connected to the input 56' and 57' of a mechanical differential unit 58' to set the output 59' of the latter to a value proportional to the total weight of the aircraft. The output 59' through shaft 61' sets the contact arm 62' of resistor 63' of bridge 65' to a value proportional to such total weight and the resistors 73' and 85' of bridge 65', as previously described, will be set to values proportional to the total weight plus the value of gross weight crew and passenger compensation resistor 66', set through shaft 69' by knob 71' of dial 72'. As the resistor 85' is connected by lead 99' to junction 97' of center of gravity bridge 98', it will form one arm of said bridge.

Shaft 33' is also connected to the contact arm 87' of a variable resistor 88', which will be set to a value proportional to the weight on the main wheels. Resistor 88' is connected to the contact arm 89' of main wheel weight crew and passenger compensation resistor 91', one end of which is connected to positive terminal 64'. The position of contact arm 89' is set by means of a shaft 92' controlled by knob 93' of dial 94'. Thus the sum of resistors 88' and 91' will be proportional to the compensated weight on the main wheels and the contact arm 87' is connected by lead 96' to junction 97' of bridge 98' to form a second arm of said bridge.

The third and fourth arms of bridge 98' are identical to the corresponding arms of bridge 98 of Fig. 1 comprising the series connected resistors 111', 117' and 118' in the third arm and the balancing resistor 104' in the fourth arm.

Figure 4:
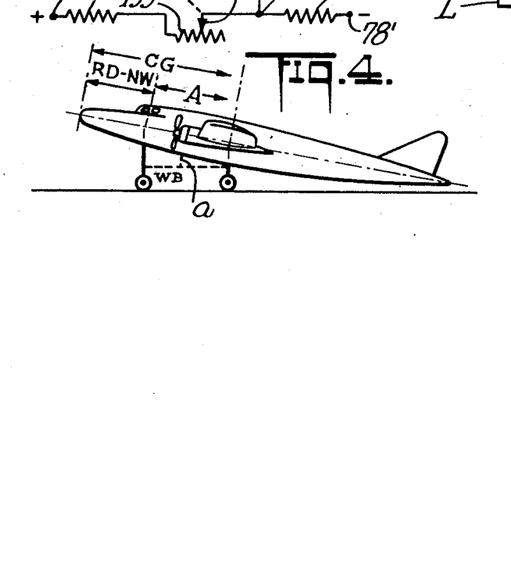
Fig. 4 is a view similar to Fig. 2, illustrating the use of the equipment when the moments are determined about the nose wheel.

The balanced position of variable resistor 104' is related to the distance of the center of gravity from the nose wheel according to the formula:

$$\frac{A}{WB} = \frac{MW}{TW}$$

where, as shown in Fig. 4, A is the distance of the center of gravity from the nose wheel, WB is the distance between the nose wheel and the main wheels (or the wheelbase resistor 117' as corrected by the settings of series connected off-level correction resistor 118' and wheelbase correction resistor 111', as previously described with respect to the embodiment of Fig. 1), MW is the total weight on the main wheels (determined by series connected main wheel weight resistor 88' and main wheel weight crew and passenger compensation resistor 91') and TW is the total weight of the aircraft (determined by resistor 85' which corresponds to the settings of series connected gross weight resistor 63' and gross weight crew and passenger compensation resistor 66').

Where the center of gravity indication is to be in terms of distance from the nose wheel, the shaft 129' of servomotor 128' of bridge 98' may also drive a suitable indicator. Where the center of gravity indication is to be in terms of distance from a reference datum other than the nose wheel, for universal application of the equipment for all types of aircraft, additional circuit components are utilized.

Thus, assuming that the reference datum is the nose of the aircraft as shown in Fig. 4, an additional balancing circuit 132' is provided, also preferably a bridge.

The shaft 129' of servomotor 128' of bridge 98' also drives the contact arm 133' of a variable resistor 134' to set the latter to a value proportional to the distance of the center of gravity from the nose wheel. One end of resistor 134' is connected to junction 137' of bridge 132' and the contact arm 133' is connected to terminal 141' to which terminal 142' of adaptor 107' is connected, said adaptor also having a terminal 143' connected to terminal 161' to which one end of a compensating variable resistor 162' is connected. The contact arm 163' of resistor 162' is connected to positive terminal 64' and is set to desired position by means of a shaft 164' controlled by knob 165' of dial 166'.

As in practice, the position of the nose wheel may shift so that the distance between the reference datum and the nose wheel may deviate from the distance specified in the technical manual for the aircraft type, by having a resistor 144' in the adaptor connected to terminals 142' and 143' respectively and of value proportional to the distance of the reference datum from the nose wheel, less fifteen inches (illustratively 85 inches), if the contact arm 163' of resistor 162' in series therewith is set to midpoint, then a value of the distance between the reference datum and the nose wheel equal to the specified distance will be set into circuit. If required, by shifting the contact arm 163', a value more or less than the specified value can be placed into circuit.

A pair of resistors 145' and 146' are connected at one end respectively to junctions 137', 139' and at their other ends to negative terminal 78' to form the second and third arm of bridge 132'. One end of a fixed resistor 138' is connected to positive main 64' and its other end to one end of variable balancing resistor 135', the contact arm 136' of which is connected to junction 139' so that series connected resistors 135' and 138' form the fourth arm of bridge 132'.

Connected across junctions 137' and 139' is a servo-amplifier 147' which controls a servomotor 148' and servomotor 148' through shaft 149' determines the setting of contact arm 136'.

In the operation of the equipment shown in Fig. 3, after the distance of the center of gravity from the nose wheel is determined by bridge 98, when the bridge 132' is in balance the resistor 135' will become set to a value equal to the value of resistors 134', 144' and 162' (the distance of the center of gravity from the nose wheel plus the compensated distance of the nose wheel from the reference datum) less the value of resistor 138' which, as has previously been described, is provided to facilitate the calibration of the center of gravity indicator 152'. As indicator 152' is controlled by servomotor 148' of bridge 132' it will become set to a value related to the distance of the center of gravity from the reference datum.

Where the aircraft is weighed under conditions such that it is subjected to the action of the wind, the direction and velocity of the wind at the time of weighing of the aircraft will be a factor in the weight of the aircraft on the nose wheel and main wheels. Thus, for example, if during the weighing operation the wind is blowing directly towards the nose of the aircraft it will provide lift, due to the action of the wind on the wings, so that the resultant weight indication will be less than the actual weight of the aircraft. Conversely, if the wind is blowing toward the tail of the aircraft, added force will be provided on the scales due to the action of the wind on the wings so that the resultant weight indication will be greater than the actual weight of the aircraft. Hence for accurate determination of the center of gravity, the wind effect on the aircraft weight must be taken into consideration in the determination of the center of gravity. Although the compensation for the effect of the direction and velocity of the wind may be introduced into the equipment in any suitable manner, in the embodiments shown, the nose wheel and total wheel weight resistors, the main wheel and total wheel weight resistors, and the nose wheel and main wheel weight resistors, respectively are so mounted that they may be adjusted to either increase or decrease their effective value by an amount dependent upon the wind direction and velocity.

Figure 5:
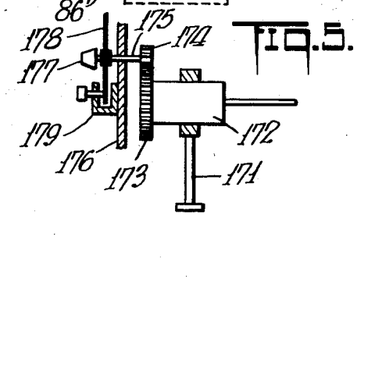
Fig. 5 is a diagrammatic view of equipment for compensating for the effects of the wind on the center of gravity of the aircraft.

Thus, for example, as shown in Fig. 5, a suitable bracket 171 may rotatably mount each of the resistor casings 172, each casing having a gear 173 affixed thereto and meshing with a pinion 174 driven by a shaft 175 extending through the panel 176 of the equipment. The shaft 175 has a knob 177 mounted thereon which has a dial 178 calibrated in pounds on each side of a zero reference point. By means of a suitable lock 179, the knob may be retained in set position.

To compensate for the wind, the knobs 177 are unlocked and rotated to desired position based upon the wind direction and velocity.

As a result, through shaft 175 and pinion 174, gear 173 and casing 172 of the resistor will rotate to add or subtract resistance, as the case may be, from the value to be set into circuit by the action of the servo-motor associated with the resistor. The knob 177 is then locked and the equipment thereupon operates in the manner described so that the determination by the equipment will include the wind velocity and direction as a factor.

The equipment above described thus permits determination of the center of gravity of an aircraft without need for crew or passengers being on board, as it has means for compensating for the weight of such personnel. It also has means for compensating for the off-lever attitude of the aircraft at the time the center of gravity indication is effected, as well as for variations in the length of the wheelbase or the arms of the supporting gear, as the case may be, from the values given in the technical manual of the aircraft. Although the equipment as illustratively shown and described compensates for all of such factors, it is within the scope of the invention to compensate for one or more of such factors.

It will be clear that the equipment of the present invention may be used to determine the position of the center of gravity of any of a multiplicity of types of aircraft and to indicate such position in inches on but a single dial scale. All that is required is to have for each model of aircraft a plug-in adaptor which in the embodiment of Fig. 1 would contain the resistors 117, 118 and 144; in the embodiment of Fig. 3, the resistors 117', 118' and 144' and in the embodiment of Fig. 6 the resistors 207 and 208, all calibrated in the manner previously set forth.

It is thus seen that each of the various compensating factors that may vary from plane to plane or from flight to flight of any one aircraft or model thereof, can readily and unerringly be introduced into circuit to assure correct determination of the center of gravity with all such variable factors included.

While in the specification and drawings, strain gauges have been shown as the weight responsive impedance controlling elements to measure weight, it is of course to be understood that other types of weight responsive means such as hydraulic cells, beam or spring scales and the like could be used to place appropriate impedance in circuit.

It is further to be understood that although the impedances as illustrated in the specification and drawings are resistors, other types of impedances such as reactances containing either or both inductances and capacitances could be used for the purpose.

Where the equipment is capable of universal use for various models of aircraft, it ordinarily will be retained on the airfield, but if desired, can be carried by an aircraft and set to fit its particular requirements as above described.

Although aircraft generally are provided with two sets of supporting gear such as the two main wheels and an additional or nose wheel respectively, the aircraft could have auxiliary wheels associated with the main wheels and the designation "main wheels" includes such auxiliary wheels.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for determining the position of center of gravity from a given reference datum, of an aircraft of the type having two sets of supporting gear, one set comprising the main gear and the other set an additional gear, said equipment comprising variable impedance means respectively calibrated for response proportional to the weight carried by such sets of supporting gear, an additional impedance means, means controlled by the variable impedance means for one of the sets of supporting gear to set said additional impedance means to an effective value that corresponds to the weight on said associated set of supporting gear, a second additional impedance means, means controlled by the variable impedance means to set said second additional impedance means to an effective value that corresponds to the combined weight on the two sets of supporting gear, a further impedance means of value corresponding to distance between the additional set of supporting gear and the main set of supporting gear, a balancing circuit having four arms including said additional, said second additional and said further impedance means together with a fourth variable impedance means the setting of which is determined by unbalance of said balancing circuit, with said additional and second additional impedance means in different arms, and said further and said fourth impedance means in different arms, a selectively controlled variable compensating impedance means controlling the effective value of at least one of the first three impedance means, means controlled by a current through the arms of the balancing circuit to adjust said fourth variable impedance means until the balancing circuit is in balance, whereby said fourth variable impedance means will be set to a value correlated with the compensated distance of the center of gravity of the aircraft from the set of supporting gear other than that associated with the additional impedance means, a second balancing circuit having four arms, said second balancing circuit having impedance means in one arm of value corresponding to the distance between the reference datum and the main gear, a pair of variable impedance means in a second arm of said balancing circuit, one of said pair of variable impedance means being a balancing impedance means and the other of said pair of variable impedance means being operatively connected to the means controlled by the current through the first balancing circuit to be set to a value corresponding to the setting of the fourth variable impedance means of said first balancing circuit, a pair of impedance means in the third and fourth arms of said second balancing circuit opposed respectively by the other two arms, means controlled by a current through the arms of said second balancing circuit to adjust said balancing impedance means until the second balancing circuit is in balance at which time the balancing impedance means will be set to a value that corresponds to the difference between the value of the impedance means in the first arm of the second balancing circuit and the impedance means operatively connected to said fourth variable impedance means, and an indicator controlled by the current controlled means of said second balancing circuit which shows the distance from the point of reference to the center of gravity.

2. The combination set forth in claim 1 in which the impedance means in the first arm of the second balancing circuit is a resistor of ohmic value corresponding to the distance between the reference datum and the main gear less a given distance and a variable compensating impedance means is in series with said impedance means and of ohmic value greater than the given distance, whereby the combined value of said two series connected impedance means may be set to a value between the value of the impedance means and the value of the impedance means plus the value of the variable compensating impedance means, thereby placing into circuit resistance of ohmic value related to the actual distance between the two sets of gear.

3. Equipment for determining the position of center of gravity from a given reference datum of an aircraft of the type having two sets of supporting gear, one set comprising the main gear and the other set an additional gear, said equipment comprising variable impedance means respectively calibrated for response proportional to the weight carried by such sets of supporting gear, an additional impedance means, means controlled by the variable impedance means for one of the sets of supporting gear to set said additional impedance means to an effective value that corresponds to the weight on said associated set of supporting gear, a second additional impedance means, means controlled by the variable impedance means to set said second additional impedance means to an effective value that corresponds to the combined weight on the two sets of supporting gear, a further impedance means of value corresponding to distance between the additional set of supporting gear and the main set of supporting gear, a balancing circuit having four arms including, said additional, said second additional and said further impedance means together with a fourth variable impedance means the setting of which is determined by unbalance of said balancing circuit, with said additional and second additional impedance means in different arms, and said further and said fourth impedance means in different arms, a selectively controlled variable compensating impedance means controlling the effective value of at least one of the first three impedance means, means controlled by a current through the arms of the balancing circuit to adjust said fourth variable impedance means until the balancing circuit is in balance, whereby said fourth variable impedance means will be set to a value correlated with the compensated distance of the center of gravity of the aircraft from the set of supporting gear other than that associated with the additional impedance means, a second balancing circuit having four arms, said second balancing circuit having a balancing variable impedance means in one arm and a pair of series connected impedance means in a second arm, one of said pair of impedance means being operatively connected to the means controlled by the current through the first balancing circuit to be set to a value corresponding to the setting of the fourth variable impedance means of said first balancing circuit and the other of said pair of impedance means being of value corresponding to the distance between the reference datum and the additional gear, a pair of impedance means in the third and fourth arms of said second balancing circuit opposed respectively by the other two arms, means controlled by a current through the arms of said second balancing circuit to adjust said balancing impedance means until the second circuit is in balance at which time the balancing impedance means will be set to a value that corresponds to the sum of the pair of impedance means, and an indicator controlled by the current controlled means of said second balancing circuit which shows the distance from the point of reference to the center of gravity.

4. The combination set forth in claim 3 in which the other of said pair of impedance means is a resistor of ohmic value corresponding to the distance between the reference datum and the additional gear less a given distance and a variable compensating impedance means is in series with said impedance means and of ohmic value greater than the given distance, whereby the combined value of said two series connected impedance means may be set to a value between the value of the impedance means and the value of the impedance means plus the value of the variable compensating impedance means.

5. Equipment for determining the position of the center of gravity of an aircraft of the type having two sets of supporting gear, one set comprising the main gear and the other set an additional gear, said equipment comprising variable impedance means respectively calibrated for response proportional to the weight carried by such sets of supporting gear, an additional impedance means, means controlled by the variable impedance means for one of the sets of supporting gear to set said additional impedance means to an effective value that corresponds to the weight on said associated set of supporting gear, a second additional impedance means, means controlled by the variable impedance means to set said second additional impedance means to an effective value that corresponds to the combined weight on the two sets of supporting gear, a further impedance means comprising a resistor of value corresponding to distance between the additional set of supporting gear and the main set of supporting gear, a balancing circuit having four arms including said additional, said second additional and said further impedance means together with a fourth variable impedance means the setting of which is determined by unbalance of said balancing circuit, with said additional and second additional impedance means in different arms, and said further and said fourth impedance means in different arms, a selectively controlled variable compensating impedance means comprising a manually adjustable resistor connected in series with the further impedance means and calibrated according to the formula $$\frac{WB}{\text{cosine angle ``a''}} - WB$$

where WB corresponds to the distance between the additional gear and the main gear of the aircraft and "$a$" equals the angle of inclination of the longitudinal axis of the aircraft, means mounted within the aircraft to provide an impulse of value proportional to the angle of inclination, a servo-motor controlled by such impulse to be set to a position related to such angle of inclination, said variable compensating impedance means having a control arm operatively connected to said servo-motor to be set thereby, and means controlled by a current through the arms of the balancing circuit to adjust said fourth variable impedance means until the balancing circuit is in balance whereby said fourth variable impedance means will be set to a value correlated with the compensated distance of the center of gravity of the aircraft from the set of supporting gear other than that associated with the additional impedance means.

6. The combination set forth in claim 5 in which said additional impedance means and said second additional impedance means are resistors, each having a casing, means rotatably mounting said casing, and means to rotate said casing independently of the means to set the associated impedance means.

7. Equipment for determining the position of the center of gravity of an aircraft of the type having two sets of supporting gear, one set comprising the main gear and the other set an additional gear, said equipment comprising variable impedance means respectively calibrated for response proportional to the weight carried by such sets of supporting gear, an additional impedance means, means controlled by the variable impedance means for one of the sets of supporting gear to set said additional impedance means to an effective value that corresponds to the weight on said associated set of supporting gear, a second additional impedance means, means controlled by the variable impedance means to set said second additional impedance means to an effective value that corresponds to the combined weight on the two sets of supporting gear, a further impedance means of ohmic value corresponding to distance between the additional set of supporting gear and the main set of supporting gear less a given distance, a balancing circuit having four arms including said additional, said second additional and said further impedance means together with a fourth variable impedance means the setting of which is determined by unbalance of said balancing circuit, with said additional and second additional impedance means in different arms, and said further and said fourth impedance means in different arms, a selectively controlled variable compensating impedance means comprising a resistor in series with the further impedance means and of ohmic value greater than the given distance, whereby the combined value of the further impedance means and the variable compensating impedance means may be set to a value between the value of the further impedance means and the value of the further impedance means plus the value of the variable compensating impedance means, an additional variable compensating resistor connected in series with said further impedance means and said variable compensating means and calibrated according to the formula:

$$\frac{WB}{\cosine\ angle\ "a"} - WB$$

where WB corresponds to the distance between the additional gear and the main gear of the aircraft and "$a$" equals the angle of inclination of the longitudinal axis of the aircraft, means controlled by a current through the arms of the balancing circuit to adjust said fourth variable impedance means until the balancing circuit is in balance, whereby said fourth variable impedance means will be set to a value correlated with the compensated distance of the center of gravity of the aircraft from the set of supporting gear other than that associated with the additional impedance means.

8. The combination set forth in claim 7 in which the additional impedance means is a resistor and a second additional variable compensating resistor is connected in series with the additional impedance means.

9. The combination set forth in claim 8 in which the second additional impedance means is a resistor and a third additional variable compensating resistor is connected in series with the second additional impedance means to control the arm of the balancing circuit in which said second additional impedance means is positioned.

10. Equipment for determining the position of the center of gravity of an aircraft of the type having main gear and an additional gear, comprising variable impedance units respectively calibrated for response proportional to the weight carried by such gear, means connecting the variable impedance units responsive to the weight on the main gear for addition of the weight controlled responses, a balancing circuit for hte additional gear having a variable balancing impedance unit, an additional impedance unit, means to pass opposing currents through the variable impedance unit responsive to the weight on the additional gear and the associated balancing impedance unit, means controlled by the resultant difference of potential to adjust both said balancing and said additional impedance unit until the difference of potential is eliminated, thereby to place into circuit such portion of the additional impedance unit as corresponds to the weight on the additional gear, a second balancing circuit for the main wheels having a second variable balancing impedance unit, means to pass opposing currents through the connected impedance units and the second balancing impedance unit of the second balancing unit, means controlled by the resultant difference of potential to adjust said second balancing impedance unit until the difference of potential is eliminated, thereby to set said second balancing impedance unit to a position corresponding to the total weight on the main gear, a second additional impedance unit, means controlled by the means under control of the difference of potential of the two circuits to be set to a position corresponding to the sum of the weights on the additional and main gear, said means controlling said second additional impedance unit to place into circuit such portion of the latter impedance unit as corresponds to the weight on the gear of the aircraft, a further impedance unit of value corresponding to distance between the additional gear and the main gear, a balancing circuit including said additional, said second additional and said further impedance units together with a fourth variable impedance unit, with said additional and second additional impedance units in different arms and said further and said fourth variable impedance units in different arms, means controlled by a current through the arms of the balancing circuit to adjust said fourth variable impedance unit until the difference of potential across the balancing circuit has been eliminated, whereby said fourth variable impedance unit will be set to a value correlated with the distance of the center of gravity of the aircraft from the main gear.

11. The combination set forth in claim 10 in which said further impedance unit is a variable resistor and a variable compensating resistor is connected in series with said further impedance unit in the same arm of said balancing circuit.

12. The combination set forth in claim 10 in which said further impedance unit is a variable resistor and a pair of variable compensating resistors are connected in series with said further impedance unit in the same arm of said balancing circuit.

13. The combination set forth in claim 10 in which the means set to a position corresponding to the weight on the gear is a mechanical differential unit having a pair of additive inputs operatively connected to the means controlled by the difference of potential of the two balancing circuits, and an output set to a position corresponding to the sum of the inputs.

14. The combination set forth in claim 13 in which a second balancing circuit is provided having a variable impedance unit in one arm set by said differential unit to a value corresponding to the sum of the weights on the gear and a balancing impedance unit in a second arm, means controlled by the resultant difference of potential from said second balancing circuit to adjust said balancing impedance unit until the difference of potential is eliminated, said second additional impedance unit also being controlled by said means.

15. The combination set forth in claim 14 in which said variable impedance unit in said second balancing circuit and said additional impedance unit are resistors, and compensating variable resistors are connected respectively in series with said variable impedance unit and said additional impedance unit, whereby said second additional impedance unit will be set to a value corresponding to the sum of the variable impedance unit and its compensating resistor, and the compensating resistor associated with the additional impedance unit is included in the same arm of the first balancing circuit.

16. The combination set forth in claim 15 in which said further impedance unit is a variable resistor and a variable compensating resistor is connected in series with said further impedance unit in the same arm of the first balancing circuit.

17. Equipment for determining the position of the center of gravity of an aircraft of the type having main gear and an additional gear, comprising variable impedance units respectively calibrated for response proportional to the weight carried by such gear, means connecting the variable impedance units responsive to the weight on the main gear for addition of their weight controlled responses, a balancing circuit for the main gear having a variable balancing impedance unit, an additional impedance unit, means to pass opposing currents through the connected variable impedance units and balancing impedance units of said balancing circuit, means controlled by the resultant difference of potential to adjust both said balancing and said additional impedance units until the difference of potential is eliminated, thereby to place into circuit such portion of the additional impedance unit as corresponds to the weight on the main gear, a second balancing circuit for the additional gear having a variable balancing impedance unit, means to pass opposing currents through the variable impedance unit responsive to the weight on the additional gear and the associated balancing impedance unit of the second balancing unit, means controlled by the resultant difference of potential to adjust said balancing impedance unit until the difference of potential is eliminated, thereby to set said balancing impedance unit to a position corresponding to the weight on the additional gear, a second additional impedance unit, means controlled by the means under control of the difference of potential of the two balancing circuits to be set to a position corresponding to the sum of the weights on the additional and main gear, said means controlling said second additional impedance unit to place into circuit such portion of the latter impedance unit as corresponds to the weight on the gear of the aircraft, a further impedance unit of value corresponding to distance between the additional gear and the main gear, a balancing circuit including said additional, said second additional and said further impedance units together with a fourth variable impedance unit, with said additional and second additional impedance units in different arms, and said further and fourth variable balancing impedance units in different arms, means controlled by a current through the arms of the balancing circuit to adjust said fourth variable impedance unit until the difference of potential from the bridge has been eliminated, whereby said fourth variable impedance unit will be set to a value correlated with the distance of the center of gravity from the additional gear.

18. Equipment for determining the position of the center of gravity from a given reference datum of an aircraft of the type having two sets of supporting gear, one set comprising the main gear and the other an additional gear, said equipment comprising variable impedance means respectively calibrated for response proportional to the weight carried by such sets of supporting gear, means to set said variable impedance means, an additional impedance means, means controlled by the setting of the variable impedance means for the additional supporting gear to set said additional impedance means to an effective value that corresponds to the weight on said additional supporting gear, a second additional impedance means, means controlled by the variable impedance means to set said second additional impedance means to an effective value that corresponds to the combined weight on the two sets of supporting gears, a further impedance means of value corresponding to distance between the additional and the main sets of supporting gear, a balancing circuit including said additional, said second additional, said further impedance means together with a fourth variable impedance means, said four impedance means being connected in said balancing circuit so that at balance thereof, the fourth variable impedance means will be set to a value proportional to the product of the weight on the additional set of supporting gear and the distance between the two sets of supporting gear divided by the combined weights on said sets of supporting gear, means controlled by the unbalance of said balancing circuit to adjust said fourth variable impedance means until the balancing circuit is in balance, whereby said fourth variable impedance means will be set to a value correlated with the distance of the center of gravity of the aircraft from the main supporting gear, a second balancing circuit including a balancing impedance means and an impedance means of value proportional to the distance between the reference datum and the main gear, a variable impedance means controlled by the setting of the fourth variable impedance means of the first balancing circuit, and circuit means controlled by the setting of the variable impedance means in said second balancing circuit to set said balancing impedance means of the second balancing circuit to a value proportional to the difference between the value of the impedance means proportional to the distance between the reference datum and main gear and the value of the variable impedance means controlled by the setting of the fourth variable impedance means or the distance of the center of gravity position from the reference datum.

19. Equipment for determining the position of the center of gravity from a given reference datum of an aircraft of the type having two sets of supporting gear, one set comprising the main gear and the other an additional gear, said equipment comprising variable impedance means respectively calibrated for response proportional to the weight carried by such sets of supporting gear, means to set said variable impedance means, an additional impedance means, means controlled by the setting of the variable impedance means for the main supporting gear to set said additional impedance means to an effective value that corresponds to the weight on said main supporting gear, a second additional impedance means, means controlled by the variable impedance means to set said second additional impedance means to an effective value that corresponds to the combined weight on the two sets of supporting gears, a further impedance means of value corresponding to distance between the additional and the main sets of supporting gear, a balancing circuit including said additional, said second additional, said further impedance means together with a fourth variable impedance means, said four impedance means being connected in said balancing circuit so that at balance thereof, the fourth variable impedance means will be set to a value proportional to the product of the weight on the main supporting gear and the distance between the two sets of supporting gear divided by the combined weights on said sets of supporting gear, means controlled by the unbalance of said balancing circuit to adjust said fourth variable impedance means until the balancing circuit is in balance, whereby said fourth variable impedance means will be set to a value correlated with the distance of the center of gravity of the aircraft from the additional supporting gear, a second balancing circuit including a balancing impedance means, and impedance means of value proportional to the distance between the reference datum and the additional gear, a variable impedance means controlled by the setting of the fourth variable impedance means of the first balancing circuit, and circuit means controlled by the setting of the variable impedance means in said second balancing circuit to set said balancing impedance means of the second balancing circuit to a value proportional to the sum of the values of the impedance means proportional to the distance between the reference datum and the additional gear and the value of the variable impedance means controlled by the setting of the fourth variable impedance means or the distance of the center of gravity position from the reference datum.

References Cited in the file of this patent

UNITED STATES PATENTS

| | | |
|---|---|---|
| 2,443,098 | Dean | June 8, 1948 |
| 2,520,428 | Nilakantan | Aug. 29, 1950 |
| 2,540,807 | Berry | Feb. 6, 1951 |
| 2,541,429 | Mathes et al. | Feb. 13, 1951 |
| 2,735,291 | Quinn | Feb. 21, 1956 |